(12) United States Patent
Wang et al.

(10) Patent No.: US 7,307,778 B2
(45) Date of Patent: Dec. 11, 2007

(54) COMPOSITIONS AND PROCESSES FOR FORMAT-FLEXIBLE, ROLL-TO-ROLL MANUFACTURING OF ELECTROPHORETIC DISPLAYS

(75) Inventors: Xiaojia Wang, Fremont, CA (US); Chia-Pu Chang, Saratoga, CA (US); Sean Kiluk, Pleasanton, CA (US); Zarng-Arh George Wu, Chung-Li (TW); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 523 days.

(21) Appl. No.: 11/054,260

(22) Filed: Feb. 8, 2005

(65) Prior Publication Data
US 2005/0236367 A1    Oct. 27, 2005

Related U.S. Application Data

(63) Continuation-in-part of application No. 10/422,608, filed on Apr. 23, 2003, now Pat. No. 6,873,452.

(60) Provisional application No. 60/375,955, filed on Apr. 24, 2002.

(51) Int. Cl.
*G02B 26/00* (2006.01)
*G09B 67/00* (2006.01)
*C09K 5/00* (2006.01)

(52) U.S. Cl. ............................ 359/296; 8/527; 8/553; 252/79.1

(58) Field of Classification Search ................ 359/296, 359/452; 252/79.1; 8/151, 527, 553, 564; 430/5, 40, 311, 313, 327, 329; 204/450, 204/453, 485, 600, 606; 216/13, 41, 47, 216/83; 162/158; 435/287.8; 445/24; 95/187; 208/327, 330
See application file for complete search history.

(56) References Cited

U.S. PATENT DOCUMENTS

| | | | |
|---|---|---|---|
| 2,989,360 A * | 6/1961 | Mautner | 8/553 |
| 3,242,227 A * | 3/1966 | Kroeper et al. | 95/187 |
| 3,438,772 A | 4/1969 | Gundlach | 430/40 |
| 3,612,758 A | 10/1971 | Evans et al. | 348/803 |
| 3,989,452 A * | 11/1976 | Hugelshofer | 8/527 |
| 4,111,650 A * | 9/1978 | Lacroix et al. | 8/527 |
| 5,930,026 A | 7/1999 | Jacobson et al. | 359/296 |
| 5,961,804 A | 10/1999 | Jacobson et al. | 204/606 |
| 6,672,921 B1 | 1/2004 | Liang et al. | 445/24 |
| 6,829,078 B2 * | 12/2004 | Liang et al. | 359/296 |
| 6,831,770 B2 * | 12/2004 | Liang et al. | 359/296 |
| 6,833,943 B2 * | 12/2004 | Liang et al. | 359/296 |
| 7,112,114 B2 * | 9/2006 | Liang et al. | 445/24 |
| 7,158,282 B2 * | 1/2007 | Liang et al. | 359/296 |
| 2004/0045830 A1 | 3/2004 | Tseng et al. | 204/600 |

FOREIGN PATENT DOCUMENTS

| | | |
|---|---|---|
| JP | 06-281943 | 7/1994 |
| WO | WO 01/67170 | 9/2001 |
| WO | WO 02/065215 | 8/2002 |
| WO | WO 03/081325 | 10/2003 |

OTHER PUBLICATIONS

Allen, K. (Oct. 2003). Electrophoretics Fulfilled. *Emerging Displays Review: Emerging Display Technologies, Monthly Report*—Oct. 9-14, 2003.
Bardsley, J.N. & Pinnel, M.R. (Nov. 2004) Microcup™ Electrophoretic Displays. *USDC Flexible Display Report*, 3.1.2. pp. 3-12-3-16.
International Search Report, PCT/US03/12582, Aug. 2003, PCT.
International Search Report, PCT/US03/12582, Mar. 2004, PCT.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, 19.6.1.
Chen, S.M. (Jul. 2003) The Applications for the Revolutionary Electronic Paper Technology. *OPTO News & Letters*, 102, 37-41. (in Chinese, English abstract attached, full translation available upon request).
Chen, S.M. (May 2003) The New Applications and the Dynamics of Companies. *TRI*. 1-10. (In Chinese, English abstract attached, full translation availabe upon request).
Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.
Ho, C.,& Liang, R.C. (Dec. 2003). *Microcup (R) Electronic Paper by Roll-to-Roll Manufacturing Processes*. Presentation conducted at FEG, Nei-Li, Taiwan.
Hopper, M., et al, (1979) An Electrophoretic Display, Its Portperties, Model and Addressing. *IEEE Trans. Electr. Dev.*, 26(8), pp. 1148-1152.
Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.
Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).
Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

(Continued)

*Primary Examiner*—Loha Ben
(74) *Attorney, Agent, or Firm*—Howrey LLP (57) ABSTRACT

The invention is directed to compositions and processes useful for the roll-to-roll manufacturing of electrophoretic displays.

28 Claims, 6 Drawing Sheets

OTHER PUBLICATIONS

Liang, R.C. (Oct. 2004) *Flexible and Roll-able Display/Electronic Paper—A Technology Overview*. Paper presented at the METS 2004 Conference in Taipie, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., & Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) < Format Flexible Microcup (R) Electronic Paper by Roll-to-Roll Manufacturing Process >, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M., & Liang, R.C. (2003) Microcup Electronic Paper by Roll-to-Roll Manufacturing Processes. *The Spectrum*, 16(2), 16-21.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

* cited by examiner

BEFORE ASYMMETRIC CUTTING

ASYMMETRIC CUTTING FROM BOTTOM

FIG. 1c

EDGE SEALING

FIG. 1d

AFTER STRIPPING

COMPOSITIONS AND PROCESSES FOR FORMAT-FLEXIBLE, ROLL-TO-ROLL MANUFACTURING OF ELECTROPHORETIC DISPLAYS

This application is a continuation-in-part of U.S. application Ser. No. 10/422,608, filed Apr. 23, 2003 now U.S. Pat. No. 6,873,452, which claims the benefit of U.S. Provisional Application 60/375,955, filed Apr. 24, 2002, the contents of both applications are incorporated herein by reference in their entirety.

BACKGROUND OF THE INVENTION

1. Field of the Invention

The invention is directed to stripping compositions and processes useful for the roll-to-roll manufacturing of electrophoretic displays.

2. Description of Related Art

The electrophoretic display (EPD) is a non-emissive device based on the electrophoresis phenomenon of charged pigment particles suspended in a dielectric solvent. It was first proposed in 1969. The display usually comprises two electrode plates placed opposing each other. One of the electrode plates is usually transparent. An electrophoretic fluid composed of a colored solvent with charged pigment particles dispersed therein is enclosed between the two electrode plates. When a voltage difference is imposed between the two electrode plates, the pigment particles migrate to one side or the other causing either the color of the pigment particles or the color of the solvent being seen from the viewing side.

An improved EPD technology is disclosed in applications, U.S. Ser. No. 09/518,488 now U.S. Pat. No. 6,930,818, filed on Mar. 3, 2000 (corresponding to WO 01/67170), U.S. Ser. No. 09/784,972, filed on Feb. 15, 2001 (corresponding to WO02/65215) now U.S. Pat. No. 6,933,098 and U.S. Pat. No. 6,672,921, all of which are incorporated herein by reference. The improved EPD comprises closed cells formed from microcups of well-defined shape, size and aspect ratio, filled with charged pigment particles dispersed in a dielectric solvent or solvent mixture and sealed with a polymeric sealing layer. The manufacturing of a microcup-based electrophoretic display may be carried out roll-to-roll as disclosed in the applications identified above and as a result, the display cells sandwiched between the two electrode plates may be produced continuously on a web.

To complete the construction of such a display device, the electrode lines of the electrode substrates (or plates) must be exposed and connected to a driver circuitry. In U.S. Ser. No. 10/422,608, filed on Apr. 23, 2003, the content of which is incorporated herein by reference in its entirety, a process for removing (or stripping off) part of the display panel in order to expose and connect the conductor lines on an electrode substrate to a driver circuitry is disclosed. The process involves (1) preparing a display panel having filled display cells sandwiched between a first and a second electrode substrates; (2) removing part of a first electrode substrate by asymmetrical cutting by, for example, a die, diamond or knife or a laser cutting method followed by, for example, peeling to expose the layers underneath (which may include an adhesive layer, a primer layer, a display cell layer and in the case of a display prepared by the microcup technology, the microcup layer and the sealing layer, all of which may be collectively referred to as the "strippable layers") without touching or damaging the underlying second electrode substrate; and (3) stripping off the exposed strippable layers by a stripping solvent or solution. After stripping, the conductor lines on the second electrode substrate are exposed and ready for connection to a driver circuitry. The process may be repeated to expose the conductor lines on the first electrode substrate.

In this process, an edge coating or adhesive may be used before the stripping step to avoid undesirable undercut or penetration by the stripping solvent or solution into the active display areas.

In the case of in-plane switching EPDs, electrode lines are on only one of the two substrate layers. Stripping is required on the substrate with electrodes.

In this process, one critical step is to remove the strippable layers. However, since the strippable layers are usually good insulators adhering well onto the electrode by UV or thermal curing, removal of these layers by physical peeling tends to damage the conductor lines, particularly when the electrode is made of a thin film conductor on a substrate and, in most cases, the strippable layers cannot be removed cleanly. As a result, the residual strippable layers remaining on the conductor lines inevitably would result in poor electrical connection. A post CMP (Chemical and Mechanical Polishing), chemical microetching or ion milling process may be used after the physical peeling process to remove the remaining strippable layers without damaging the electrode substrate; however such a process could be prohibitively expensive and environmentally unfriendly for some applications.

SUMMARY OF THE INVENTION

The first aspect of the invention is directed to a stripping composition for removing the strippable layers. The composition comprises about 10% to about 60% by weight of an arylalkyl alcohol or N-methylpyrrolidone, about 30% to about 70% by weight of a low molecular weight aliphatic alcohol or lactone and about 0% to about 50% by weight of water. Additives may also be added.

The second aspect of the invention is directed to the use of a solvent pad to facilitate the stripping process. In order to prevent a stripping solvent or solution spreading into the active areas due to the capillary effect, a solvent pad may be used to confine the stripping solvent or solution in isolated areas. The solvent pad is usually a membrane or sponge which may be formed from a material such as, polyurethane, polyester, nylon, acrylics, cellulose derivative or a blend or composite thereof.

DETAILED DESCRIPTION OF THE INVENTION

Figure 1A:
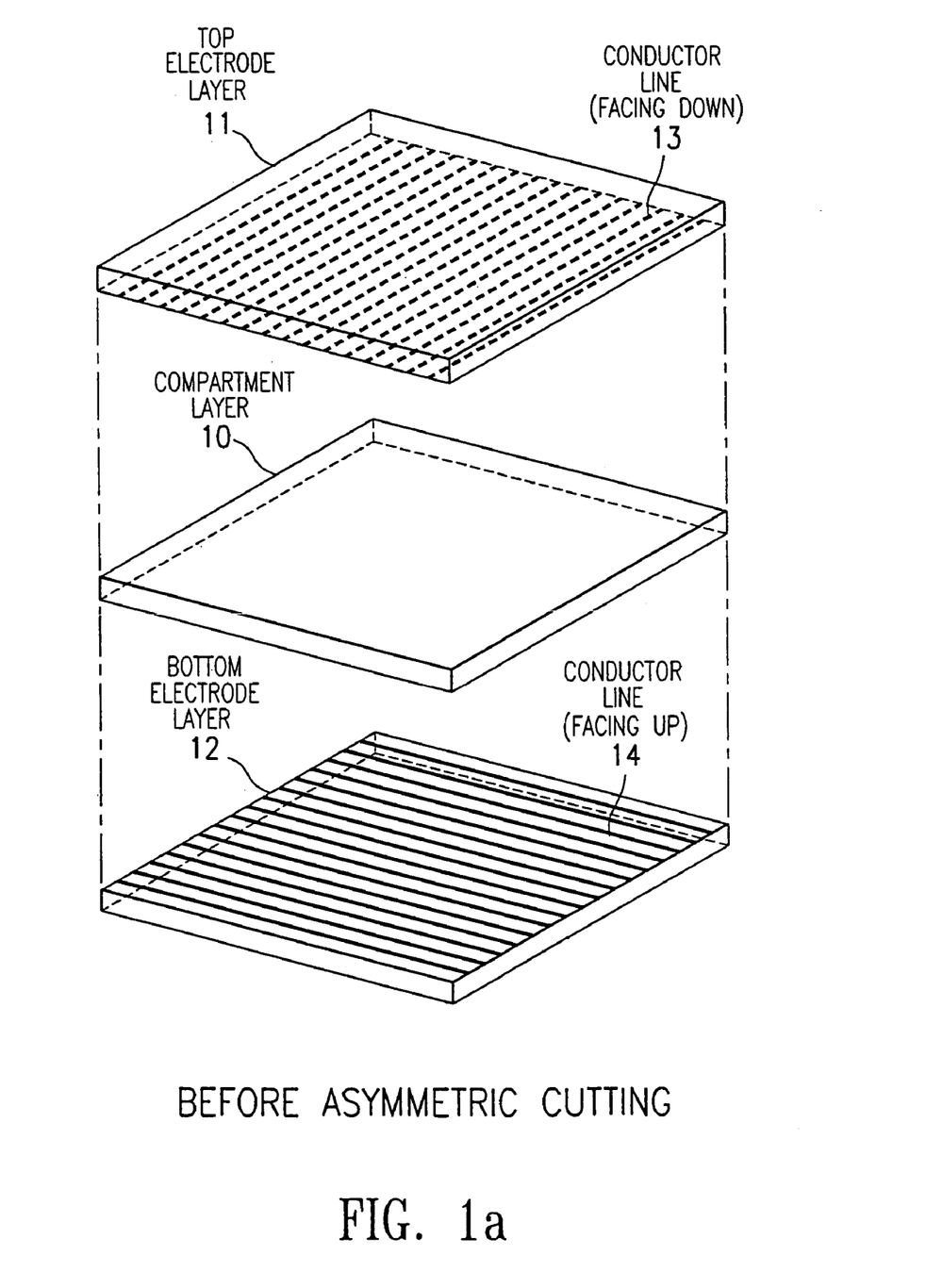
FIGS. 1a-1e illustrate the stripping process of the present invention.

FIG. 1a depicts a passive matrix electrophoretic display panel. An array of display cells (shown as a compartment layer 10 in FIGS. 1a-1e) filled with an electrophoretic fluid is sandwiched between a first (top) electrode layer (11) and a second (bottom) electrode layer (12). There may be an adhesive layer (not shown) between the compartment layer (10) and the electrode layers. Each of the electrode layers (11 and 12) may be formed of a substrate layer coated or laminated with a conductor layer such as a metal foil or a thin film of metal or metal oxide or an alloy thereof. The conductor lines on both substrate layers face the compartment layer (10), and the conductor lines (13) on the first electrode layer (11) are perpendicular to the conductor lines (14) on the second electrode layer (12). In the case of direct drive or active matrix electrophoretic displays, one of the two electrode layers, preferably the transparent viewing electrode layer is a common electrode layer. In the case of in-plane switching electrophoretic displays, the electrodes are on the same substrate, typically on the non-viewing substrate, in which case, the substrate on the viewing side may be an insulator layer.

Suitable substrate layers referred to above may include, but are not limited to, PET (polyethylene terephthalate), PEN (polyethylene naphthalate), PC (polycarbonate), polycyclic olefins, polysulphones, polyimides, polyarylethers, polyaryletherketones, acrylics, polystyrenes, poly-α-methylstyrenes, epoxys, phenolics and copolymers, blends or composites thereof.

Figure 1B:
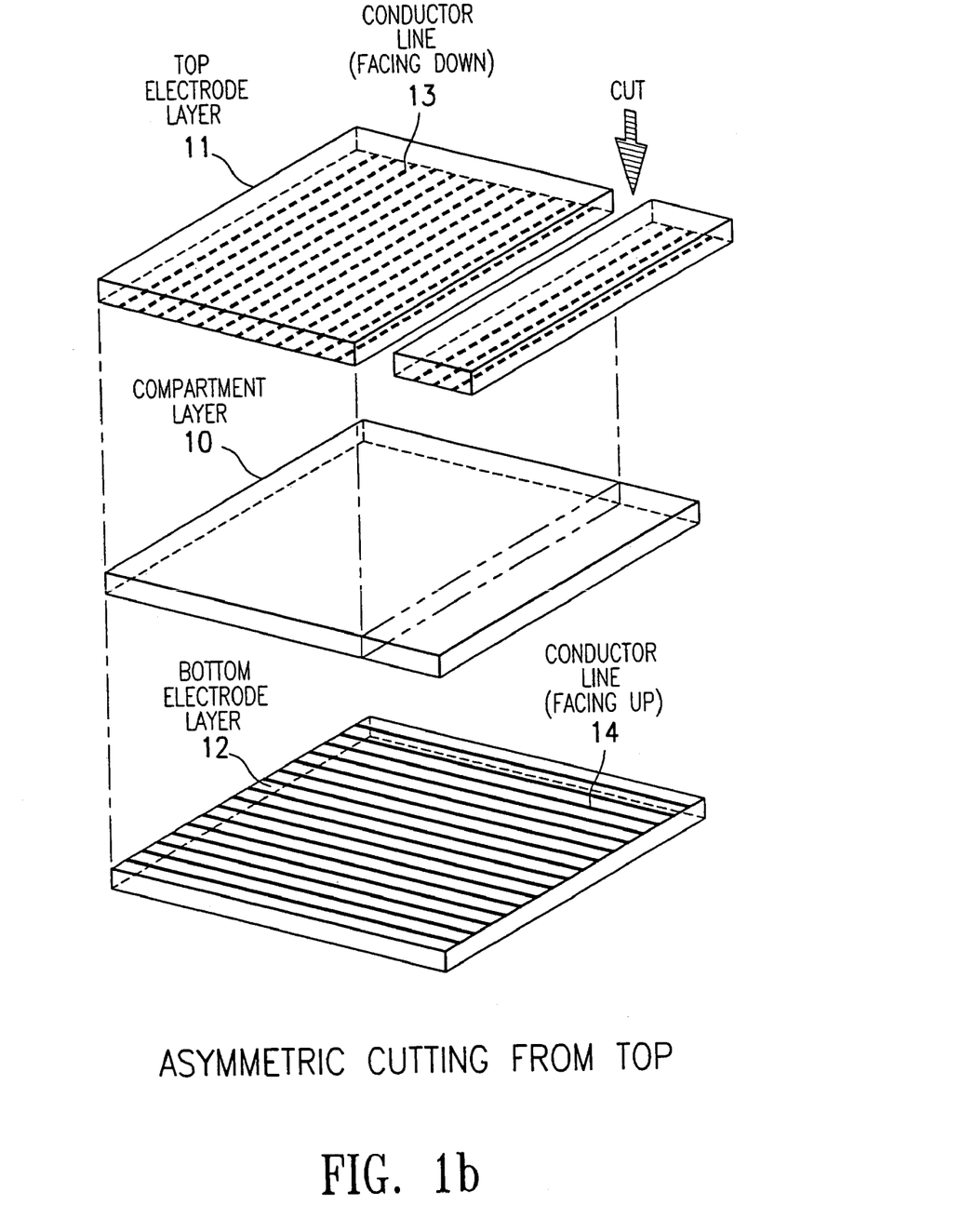
Figure 1C:
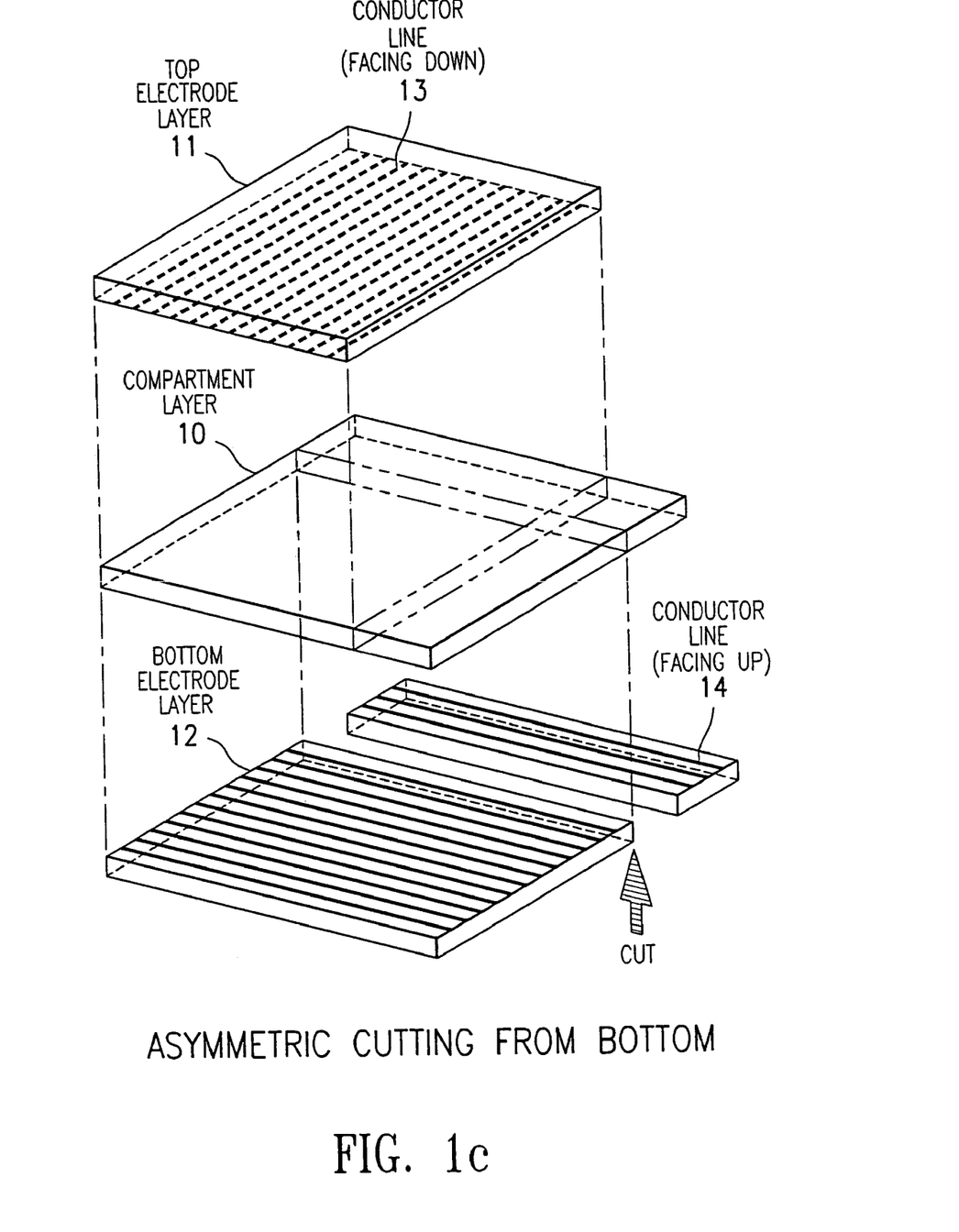
Figure 1D:
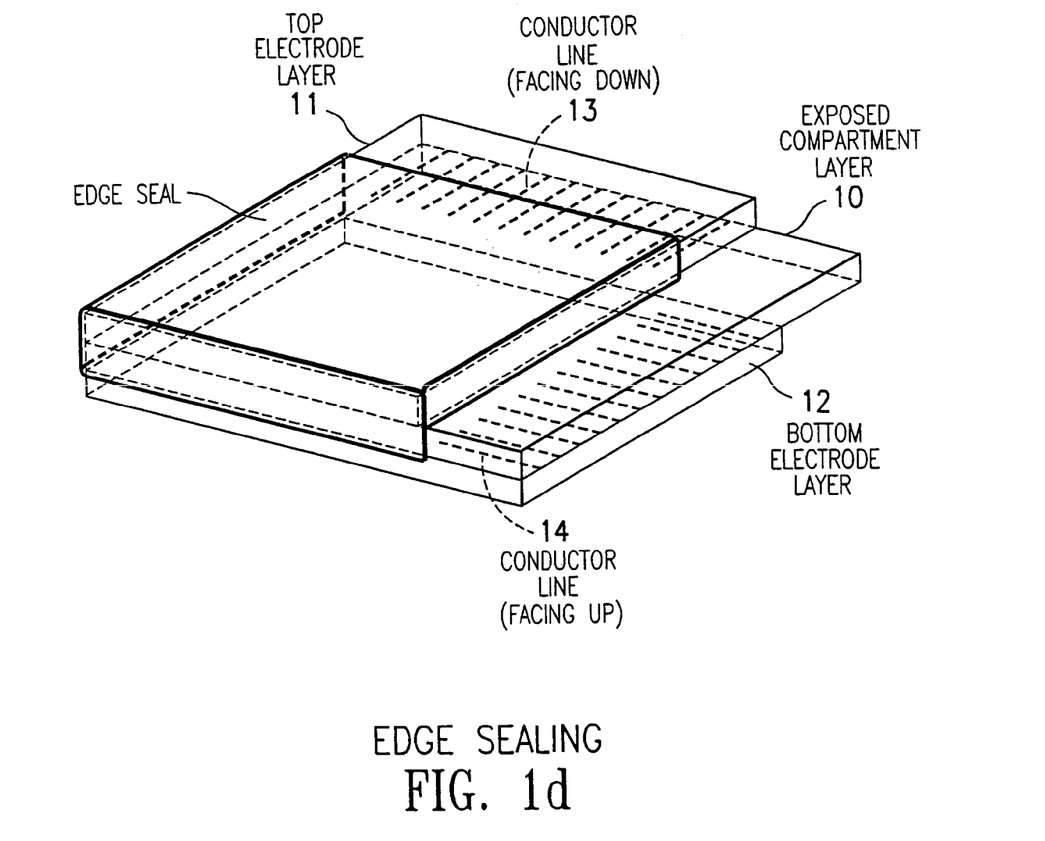
Figure 1E:
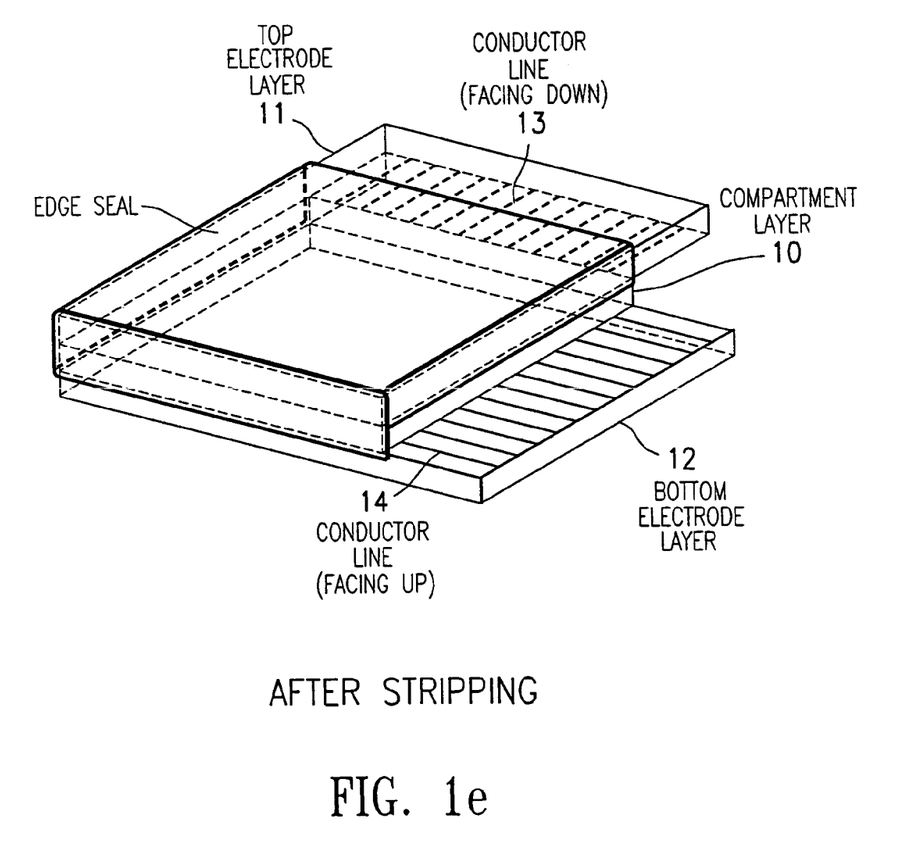

FIGS. 1b-1d demonstrate the stripping process. The process comprises several steps. As shown in FIG. 1b, a predetermined area on the first electrode layer (11) at end of a panel is removed by, for example, a die, diamond or knife or a laser cutting method. The cut may optionally extend into the compartment layer underneath the first electrode layer; but not into the second electrode layer to avoid any physical damage to the second electrode layer. Before stripping, preferably an edge sealing material is applied to all edge lines on all sides and/or to the surfaces where the edge lines appear (dark lines as shown in FIG. 1d) to protect areas not to be stripped. The exposed compartment layer (10) in the area is then subjected to stripping (FIG. 1d) by using the stripping composition of the present invention. FIGS. 1(d) and 1(e) illustrtate the stripping process to remove the compartment layer on one side only (the right-hand side to the reader). To strip off the compartment layer on the other side (the side away from the reader in these two figures), the edges in the corresponding areas may also be similarly sealed.

After the stripping step, the conductor lines on the second electrode layer (12) in the predetermined area are exposed (FIG. 1e) and are ready for connection to a driver circuitry.

To expose the electrode layer on the first substrate, the process described above is repeated by first cutting through the second electrode layer (as shown in FIG. 1c) but not touching or damaging the first electrode layer, followed by edge sealing and stripping off the compartment layer above the first electrode layer. After the stripping step, the conductor lines on the first electrode layer (11) in the predetermined area are exposed (FIG. 1e) and are ready for connection to a driver circuitry.

Figure 2:
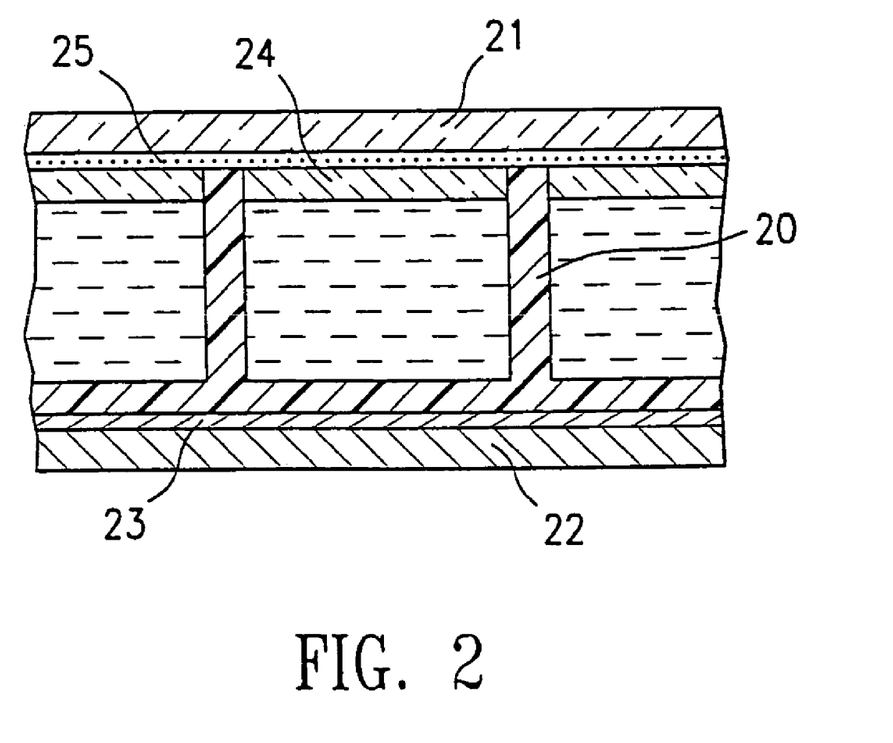
FIG. 2 is a schematic depiction of an electrophoretic display cell prepared by the microcup technology.

FIG. 2 depicts a typical display cell prepared by the microcup technology as disclosed in WO01/67170. The microcup-based display cells (20) are sandwiched between a first electrode layer (21) and a second electrode layer (22). A primer layer (23) is optionally present between the microcups and the second electrode layer (22). The microcups (20) are filled with an electrophoretic fluid and sealed with a sealing layer (24). The first electrode layer (21) is laminated onto the sealed cell, optionally with an adhesive (25).

The microcup based display panel may be prepared by microembossing or photolithography as disclosed in WO01/67170. In the microembossing process, an embossable composition is coated onto the conductor side of the second electrode layer (22) and embossed under pressure to produce the microcups.

The embossable composition may comprise a thermoplastic, thermoset or a precursor thereof which may be a multifunctional acrylate, multifunctional methacrylate, multifunctional vinylbenzene, multifunctional vinylether, multifunctional epoxide or an oligomer or polymer thereof. Multifunctional acrylate and oligomers thereof are the most preferred. A combination of a multifunctional epoxide and a multifunctional acrylate is also very useful to achieve desirable physico-mechanical properties. A crosslinkable oligomer imparting flexibility, such as urethane acrylate or polyester acrylate, is usually also added to improve the flexure resistance of the microcups. The composition may contain an oligomer, monomer, additives and optionally a polymer. The glass transition temperature (Tg) for the embossable composition usually ranges from about −70° C. to about 150° C., preferably from about −20° C. to about 50° C.

The microembossing process is typically carried out at a temperature higher than the Tg. A heated male mold or a heated housing substrate against which the mold presses may be used to control the microembossing temperature and pressure.

The mold is released during or after the embossable layer is hardened to reveal an array of microcups (20). The hardening of the embossable composition may be accomplished by cooling, solvent evaporation, cross-linking by radiation, heat or moisture. If the curing of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the pre-patterned male mold on to the embossable composition.

To improve the strippability of the microcup layer, an additive that is soluble or dispersible in the stripping solvent or solution, such as a surfactant, particularly a non-ionic surfactant, polymer or protective colloid that is soluble or dispersible in the stripping solvent, colloidal or nano particles (e.g., colloidal or nano silica particles or tricalcium phosphate), may be added to the embossable composition. A non-crosslinkable thermoplastic polymer that is soluble in the stripping solvent has been found particularly useful to improve the rate of stripping.

Not to be bound by theory, it is believed that the presence of a suitable concentration of a non-crosslinkable, solvent soluble or dispersible polymer significantly increases the rate of solvent penetration or swelling into the microcup layer and speeds up the stripping process. Suitable concentration of such a non-crosslinkable, solvent soluble polymer is about 3 to about 80% by weight, preferably about 5 to about 50% by weight and more preferably about 10 to about 40% by weight of the microcup layer. Suitable non-crosslinkable, solvent soluble or dispersible polymers may include, but are not limited to, acrylic or methacrylic copolymers [particularly poly(alkyl methacrylate) copolymers], poly(α-methylstyrene) copolymers, polyvinylpyrrolidone copolymers, polyvinylacetate copolymers [particularly poly (ethylene-co-vinylacetate)], polycaprolactones, polyesters, polyurethanes, polyvinylether copolymers [particularly poly (vinyl ether-co-acrylonitrile) or poly(vinylether-co-maleic anhydride)] and polyethers (particularly polypropyleneoxides and their copolymers or block copolymers with ethylene oxide). Alkyl methacrylate copolymers, polyvinylpyrrolidone copolymers and poly(ethylene oxide-b-propylene oxide) are the most preferred.

In one preferred embodiment of the present invention, a thin strippable primer layer (23) is precoated onto the conductor layer before coating the embossable composition to improve both the stripping and mold release properties.

The composition of the primer layer may be the same or different from the embossable composition.

The microcups are then filled with an electrophoretic fluid and sealed as disclosed in co-pending applications, U.S. Ser. No. 09/518,488, filed on Mar. 3, 2000 (corresponding to WO 01/67170), U.S. Ser. No. 09/784,972, filed on Feb. 15, 2001 (corresponding to WO02/65215) and U.S. Pat. No. 6,672, 921, all of which are incorporated herein by reference.

The sealing of the microcups may be accomplished in a number of ways. Preferably, it is accomplished by overcoating the filled microcups with a strippable sealing composition comprising a solvent and a rubber material selected from the group consisting of thermoplastic elastomers, polyvalent acrylate or methacrylate, cyanoacrylates, polyvalent vinyl including polyvalent vinylbenzene, polyvalent vinylsilane, polyvalent vinylether, polyvalent epoxide, polyvalent isocyanate, polyvalent allyl and oligomers or polymers containing crosslinkable functional groups. Additives such as a polymeric binder or thickener, photoinitiator, catalyst, filler, colorant or surfactant may be added to the strippable sealing composition to improve the physico-mechanical properties and the optical properties of the display. The sealing composition is incompatible with the electrophoretic fluid and has a specific gravity lower than that of the electrophoretic fluid. Upon solvent evaporation, the sealing composition forms a conforming seamless seal on top of the filled microcups. The strippable sealing layer may be further hardened by heat, radiation or other curing methods. Sealing with a composition comprising a thermoplastic elastomer is particularly preferred. Examples of thermoplastic elastomers include tri-block or di-block copolymers of styrene and isoprene, butadiene or ethylene/butylene, such as the Kraton™ D and G series from Kraton Polymer Company, and polyurethane such as polyether polyurethanes and polyester polyurerthanes. Crystalline rubbers such as poly(ethylene-co-propylene-co-5-methylene-2-norbornene) and other EPDM (ethylene propylene diene rubber terpolymer) from Exxon Mobil have also been found useful.

Alternatively, the strippable sealing composition may be dispersed into an electrophoretic fluid and filled into the microcups. The sealing composition is incompatible with the electrophoretic fluid and has a specific gravity lower than that of the electrophoretic fluid. Upon phase separation and solvent evaporation, the sealing composition floats to the top of the filled microcups and forms a seamless sealing layer thereon. The sealing layer may be further hardened by heat, radiation or other curing methods.

The sealed microcups finally are laminated with the first electrode layer (21) preferably pre-coated with an adhesive layer (25). Preferred materials for the strippable adhesive layer may be formed from one adhesive or a mixture thereof selected from the group consisting of pressure sensitive, hot melt and radiation curable adhesives. The adhesive materials may include acrylics, styrene-butadiene copolymers, styrene-butadiene-styrene block copolymers, styrene-isoprene-styrene block copolymers, polyvinylbutyal, cellulose acetate butyrate, polyvinylpyrrolidone, polyurethanes, polyamides, ethylene-vinylacetate copolymers, epoxides, multifunctional acrylates, vinyls, vinylethers and oligomers, polymers and copolymers thereof. The adhesive layer may be post cured by, for example, heat or radiation such as UV after lamination.

The display thus prepared is then subjected to cutting and stripping to expose the conductor lines for connection to driver circuitry as illustrated in FIGS. 1b-1e. The compartment layer (10) of FIGS. 1b-1e, in this context, may comprise the adhesive layer (25), if present, the primer layer (23), if present, the sealing layer (24) and the microcup layer (20), all of which may be collectively referred to as the "strippable layers". As the first step, the top electrode layer in a predetermined area, usually at the end of the panel, is removed by, for example, a die, diamond or knife or a laser cutting method. The cut may optionally extend into the strippable layers; but not into the second electrode layer. Before stripping, preferably an edge seal material is applied to the edge lines to protect the active display area from being attacked by the stripping solvent.

The strippable layers are stripped off using the stripping composition of the present invention. The stripping composition comprises about 10% to about 60%, preferably about 15 to about 50% by weight of an arylalkyl alcohol or N-methyl pyrrolidone, about 30% to about 70%, preferably about 40 to about 60% by weight of a low molecular weight aliphatic alcohol or lactone and about 0% to about 50%, preferably about 5 to about 30% by weight of water.

Suitable arylalkyl alcohols may include, but are not limited to, benzyl alcohol and its alkyl or alkoxy substituted derivatives such as methylbenzyl alcohol, dimethylbenzyl alcohol or methoxy benzyl alcohol.

Suitable low molecular weight aliphatic alcohols may include, but are not limited to, isopropyl alcohol, ethyl alcohol, butyl alcohol, methoxyethyl alcohol, ethoxyethyl alcohol and butoxyethyl alcohol.

Suitable low molecular weight lactones may include, but are not limited to, γ-butyralactone and its derivatives.

The molecular weight of the aliphatic alcohol or lactone is preferably in the range of about 30 to about 200, more preferably in the range of about 45 to about 150.

Additives may also be added to the composition. For example, the composition may further comprise a surfactant particularly a non-ionic surfactant having a HLB value of about 7 to about 15, preferably 10 to 16 and more preferably 11 to 14, at a concentration of about 0.01 to about 2%, preferably about 0.05 to about 0.2% by weight. Suitable non-ionic surfactants may include, but are not limited to, block copolymers of ethylene oxide and propylene oxide (the Pluronic and Tetronic series from BASF), sorbitan ethoxylates, alkylphenyl ethoxylates such as nonylphenyl ethoxylate or octylphenyl ethoxylate (the Triton™ X series), with octyl phenyl ethoxylate (commercial name: Triton X-100) as the more preferred. Ionic surfactants may also be used. Examples of ionic surfactants include, but are not limited to, salts of dodecylbenzene sulphonic acid or dodecylsulphonic acid, AOT, trimethyl dodecyl ammonium chloride and trimethyl stearyl ammonium chloride.

Moderate heat may be applied to accelerate the stripping process. The temperature is preferably in the range of about 60° C. to about 120° C., more preferably between 80° C. to about 100° C. and most preferably between 90° C. to about 95° C.

In the stripping process, a solvent pad may be placed, over or underneath, in contact with the strippable layers. The solvent pad is solvent absorbent membrane or sponge which may be formed of a material, such as, polyurethane, cotton, cellulose derivative (e.g., cellulose acetates, acrylic acid or acrylamide modified cellulose), polyester, nylon, acrylics or a blend or composite thereof.

Pads formed of a material of high critical surface tension are particularly preferred. In one embodiment, pads formed of a material having a critical surface tension higher than 30 dyne/cm, more preferably higher that 40 dyne/cm, is used.

Commercially available pads and membranes, such as, UltraSORB Wiper (Wilshire), Spec Wipe 3 (VWR) or C-PD914DD (3M) were tested and found to be satisfactory.

The pad acts as a stripping fluid reservoir and delivers a necessary amount of a stripping fluid to the strippable layers and constrains the fluid overflow during the stripping process. The pad may be filled with a single stripping solvent or a stripping composition of the present invention. The single stripping solvent may be benzyl alcohol, NMP (N-methylpyrrolidinone), methylene chloride or the like, with benzyl alcohol as the most preferred because its stripping efficiency and environmental friendliness.

The use of the solvent pad provides a clean and reproducible way to carry out the stripping process without contamination of the adjacent non-stripping areas.

Stripping may also be assisted by spraying of the stripping composition by a nozzle or compressed air, a soft brush and other mechanical or physical means. The stripping process of the invention may be used in the manufacture of electromagnetophoretic displays. The process is carried out similarly except that the first electrode layer (21) is replaced with a substrate layer (not coated with a conductor film). In other words, in the first step of the process, a part of the substrate layer is removed by die cutting or other equivalent means, followed by stripping off the strippable layers underneath to expose the electrode layer (22) for connecting the conductor lines to a driver circuitry.

EXAMPLES

The following examples are given to enable those skilled in the art to more clearly understand and to practice the present invention. They should not be considered as limiting the scope of the invention, but merely as being illustrative and representative thereof.

Example 1

I. Preparation of Strippable Primer Composition

Solution (a)

33.2 Grams of EB 600™ (acrylated epoxy oligomer, UCB, Smyrna, Ga.), 16.12 gm of SR 399™ (pentafunctional monomer, Sartomer, Exton, Pa.), 16.12 gm of TMPTA (trimethylolpropane triacrylate, UCB, Smyrna, Ga.) and 20.61 gm of HDDA (1,6-hexanediol diacrylate, UCB, Smyrna, Ga.) were added into a 250 gm plastic round bottle. The mixture was stirred with a general purpose blade at 500 rpm for 30 minutes.

Solution (b)

2 Grams of Irgacure™ 369 (2-benzyl-2-(dimethylamino)-1-[4-(4-morpholinyl)phenyl]-1-butanone, Ciba, Tarrytown, N.Y.) and 1 gm of Irganox™ 1035 (thiodiethylene bis(3,5-di(tert)-butyl-4-hydroxyhydrocinnamate) were combined into a glass bottle containing 10 gm of MEK (Fisher, Pittsburgh, Pa.). The mixture was sonicated (FS-220H, Fisher, Pittsburgh, Pa.).

Solution (c)

44.35 Grams of polyethylmethacrylate (Aldrich, Milwaukee, Wis.) and 389.15 gm of MEK were combined into a 1 liter plastic bottle and the mixture was stirred with a 1" general purpose blade at 500 rpm for 60 minutes. Solutions (a) and (b) prepared above were added into solution (c) contained in the 1 liter bottle, and the mixture was stirred with a 1" general purpose blade at 500 rpm for 30 minutes. This strippable primer solution was then coated with a # 4 wire bar onto a 4 mil ITO film. The coated ITO film was placed in an oven at 65° C. for 10 minutes and then cured with a UV conveyer at the dosage of 1.8 J/cm² under nitrogen blanket (DDU, Los Angles, Calif.).

II. Preparation of Microcups

TABLE 1

Microcup Composition

| Component | Weight Part | Source |
| --- | --- | --- |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | BF Goodrich |
| Irgacure 369 | 0.20 | Ciba |
| ITX | 0.04 | Aldrich |
| Antioxidant Ir1035 | 0.10 | Ciba |

Solution (d)

33.15 Grams of EB 600™ (acrylated epoxy oligomer, UCB, Smyrna, Ga.) and 32.24 gm of SR 399™ (pentafunctional monomer, Sartomer, Exton, Pa.), 6.00 gm of EB1360™ (silicone acrylate, UCB, Smyrna, Ga.) and 8 gm of Hycar 1300×43 (reactive liquid polymer, Noveon Inc. Cleveland, Ohio) were added into a 250 ml LDPE bottle and the mixture was stirred with Stir-Pak Laboratory mixer (Cole Parmer, Vernon, Ill.) at 500 rpm for 30 minutes.

Solution (e)

0.2 Grams of Irgacure™ 369 (2-benzyl-2-(dimethylamino)-1-[4-(4-morpholinyl)phenyl]-1-butanone, Ciba, Tarrytown, N.Y.), 0.04 gm of ITX (isopropyl-9H-thioxanthen-9-one, Aldrich, Milwaukee, Wis.), 0.1 gm of Irganox™ 1035 (thiodiethylene bis(3,5-di(tert)-butyl-4-hydroxyhydrocinnamate), Ciba, Tarrytown, N.Y.) and 20.61 gm of HDDA (1,6-hexanediol diacrylate, UCB, Smyrna, Ga.) were added into a 250 ml of LDPE bottle and the mixture was sonicated for 30 minutes (FS-220H, Fisher, Pittsburgh, Pa.).

Solution (e) prepared above was then added to solution (d) contained in the 250 ml LDPE bottle and the mixture was stirred with Stir-Pak mixer first at 500 rpm for 10 minutes and then at 2000 rpm for another minute. The mixture was then centrifuged with IEC HN-SII (International Equipment Company, Needham Heights, Mass.) at 2000 rpm for 15 minutes.

The microcup composition was slowly filled onto a 4"×4" Ni mold made from electroforming. A plastic pipette was used to gently squeeze the composition into "valleys" of the Ni mold and enough time was allowed for releasing trapped air bubbles. The thus coated Ni mold was placed on a paper-covered glass substrate (0.6 mm thick of paper, i.e., 6 sheets of copy paper, Xerographic, white 20 lb, Grays Harbor Paper, Hoquiam, Wash., on 1/16" glass) in an oven at 65° C. for 5 minutes. The microcup layer was then covered with a primer coated ITO/PET layer prepared from Section I above, with the primer layer facing the coated Ni mold. A smooth polished bar was used to squeeze out air pockets between the ITO/PET substrate and the Ni mold.

A GBC Eagle 35 laminator (from GBC, Northbrook, Ill.) with the setting of roll temperature at 100° C., lamination speed at 1 ft/min and roll gap of "heavy gauge" was then used to laminate the primer coated ITO/PET substrate over the microcup layer. A UV curing station with a UV intensity of 2.5 mJ/cm² was used to cure the panel for 5 seconds. The microcup composition coated ITO/PET layer was then peeled away from the Ni mold at an angle about 30 degrees to give a 4"×4" microcup layer.

A conveyor (DDU, Los Angles, Calif.) with a UV intensity of 1.7 J/cm² was used to post-cure the microcup layer under a nitrogen blanket.

III. Preparation of Electrophoretic Fluid 5.9 Grams of $TiO_2$ R900™ (DuPont) was added to a solution consisting of 3.77 gm of MEK, 4.54 gm of N3400™ aliphatic polyisocyanate (Bayer AG) and 0.77 gm of 1-[N,N-bis(2-hydroxyethyl)amino]-2-propanol (Aldrich). The resultant slurry was homogenized for 1 minute at 5-10° C., after which 0.01 gm of dibutyltin dilaurate (Aldrich) was added and the mixture was homogenized for an additional minute. Finally a solution containing 20 gm of HT-200™ (Ausimont, Thorofare, N.J.), 0.47 gm of $R_f$-amine4900, a condensate of Krytox methyl ester (from Du Pont) and tris(2-aminoethyl)amine was added and the mixture was homogenized again for 3 more minutes at room temperature. The $R_f$-amine4900 was prepared according to the following reaction:

($R_f$-amine4900; n = about 30)

The slurry prepared above was added slowly over 5 minutes at room temperature under homogenization into a mixture containing 31 gm of HT-200 and 2.28 gm of $R_f$-amine4900. The resultant $TiO_2$ microcapsule dispersion was stirred under low shear with a mechanical stirrer at 35° C. for 30 minutes, then heated to 85° C. to remove MEK and post cure the internal phase for three hours. The dispersion showed a narrow particle size distribution ranging from 0.5-3.5 microns. The microcapsules were separated by centrifuge.

IV. Filling and Sealing with a Strippable Sealing Composition

One gram of the electrophoretic fluid prepared in Section III was added into the microcups in the patterned area with a smoothing bar. The electrophoretic fluid comprised 6 parts (based on dry weight) of the $TiO_2$ microparticles and 94 parts of a HT-200 (Ausimont, Thorofare, N.J.) solution containing 1.5 wt % of a perfluorinated Cu-phthalocyanine dye (FC-3275, 3M, St. Paul, Minn.). The filled microcups were then sealed with a strippable sealing composition using a 6 mil coating knife.

The strippable sealing composition was prepared by mixing a 10% rubber solution consisting of 8.1 parts of Kraton G1650™ (block copolymer of styrene and butadiene, Kraton Polymer Co, Houston, Tex.), 0.9 parts of GRP 6919™ (block copolymer of styrene and butadiene, Kraton Polymer Co., Houston, Tex.), 0.3 parts of Carb-O-Sil™ TS-720 (silica particles, from Cabot Corp., Ill.), 0.03 parts of Irgacure 369 (2-benzyl-2-(dimethylamino)-1-[4-(4-morpholinyl)phenyl]-1-butanone, Ciba Specialty Chemical, Oakbrook, Ill.), 0.09 parts of ITX (Aldrich, Milwaukee, Wis.), 78.3 parts of Isopar™ E (isoparaffins fluid, Exxon Chemical Co., Houston, Tex.) and 8.7 parts of isopropyl acetate (Aldrich, Milwaukee, Wis.). The composition was overcoated onto the filled microcups by a Universal Blade Applicator and the coating was dried at room temperature to form a seamless sealing layer of about 3 micron thick.

V. Lamination

A strippable adhesive composition consisting of 20.0 gm of 50% Carboset 515 (acrylic polymers, B.F. Goodrich, Cleveland, Ohio) in 3:1 methyl ethyl ketone (MEK) (certified grade, Fisher Scientific, Pittsburgh, Pa.):2-ethoxyethanol (certified grade, Aldrich Chemical, Milwaukee, Wis.), 2.0 gm of SB400 (methacrylate oligomer, Sartomer, Exton, Pa.), 7.0 gm of SR 502 (ethoxylated (9) trimethylolpropane triacrylate, Sartomer, Exton, Pa.), 3.0 gm of CD9038 (ethoxylated (30) bisphenol A diacrylate, Sartomer, Exton, Pa.), 0.20 gm of Irgacure 369 (2-benzyl-2-(dimethylamino)-1-[4-(4-morpholinyl)phenyl]-1-butanone, Ciba Specialty Chemical, Tarrytown, N.Y.), 0.10 gm of ethyl-4-dimethylaminobenzoate (Aldrich, Milwaukee, Wis.) and 0.03 gm of isopropyl-9H-thioxanthene-9-one (ITX, Aldrich, Milwaukee, Wis.), was coated on 5 mil thick ITO/PET (CP Films, Martinsville, Va.) using a #3 Meyer bar and was dried using a heat gun for about 15 seconds.

The adhesive coated ITO/PET layer was then laminated over the sealed microcups prepared from Section IV with a GBC Eagle 35 laminator at 70° C. The lamination speed was set at 1 ft/min with a gap of 1/32". The coating was irradiated for 60 seconds using a UV conveyor (DDU, Los Angeles, Calif.) for a total exposure of 3.3 J/cm².

VI. Asymmetric Die Cutting

The laminated panel was die-cut by a cutter equipped with two knives. One of the knives was used to cut the shape for the panel and the other was used for asymmetric kiss cutting. The asymmetrical cut panel was shown in FIGS. 1b and 1c. The top ITO film layer was peeled off to expose the layers underneath, which were to be stripped.

VII. Removal of Sealing/Adhesive Layers

The sealing and adhesive layers on top of the stripped area were peeled off with a tape. The electrophoretic fluid underneath was wiped off or rinsed off from the microcups with isopropyl alcohol.

VIII. Stripping

A stripping pad that contained a stripping fluid was applied on to the area that had the sealing/adhesive layers and the electrophoretic fluid already removed. A heating bar of 90° C. temperature was then placed on the stripping pad for 20 seconds, after which time, the heating bar and the stripping pad were removed. A tape was then applied to the stripped area to remove the lifted microcups. The stripping quality was judged by how much of the microcups had been removed from the stripped area. The results are summarized in the following table:

| Stripping Fluid | Maximum Working Temperature (° C.) | Minimum Holding Time (sec) | Stripping Result |
| --- | --- | --- | --- |
| Commercial Stripping Fluid[1] | 20 | 150 | Excellent |
| Commercial Bond Breaker[2] | 20 | 300 | Poor |
| Commercial Cleanup Solvent[3] | 20 | 300 | Poor |
| Methylethylketone | 60 | 300 | Poor |
| Isopropyl Alcohol | 60 | 300 | Poor |
| Ethyl Acetate | 60 | 300 | Poor |
| NMP[6] | 80 | 60 | Excellent |
| Benzyl Alcohol | 90 | 90 | Excellent |
| Cyclohexanone | 120 | 600 | Poor |
| DEGDEE[7] | 120 | 90 | Poor |
| Stripping Fluid 1[4] | 90 | 20 | Excellent |
| Stripping Fluid 2[5] | 90 | 20 | Excellent |

Excellent: <1% residue,
Poor: >30% residue.

-continued

| Stripping Fluid | Maximum Working Temperature (° C.) | Minimum Holding Time (sec) | Stripping Result |
|---|---|---|---|

(1)Commercial Stripping Fluid: methylene chloride (85~90%), methanol (1~5%), carbon dioxide (1~5%) and nonylphenoxypolyethoxyethanol (1~5%)
(2)Commercial Bond Breaker: methylene chloride (60%), methyl alcohol (20%), xylene (10%), toluene (3%), acetone (3.5%) and alkylphenol ethoxylate (2%)
(3)Commercial Cleanup Solvent: dipropylene glycol monomethyl ether (76.75%), trimethyl benzene 1,2,4 (7.44%) and aromatic petroleum naphtha 100 (14.65%)
(4)Stripping Fluid 1: 56.3% isopropyl alcohol, 28.2% water, 15% benzyl alcohol and 0.5% Triton X-100
(5)Stripping Fluid 2: 44% isopropyl alcohol, 11% water and 45% benzyl alcohol
(6)NMP is N-methylpyrrolidinone
(7)DEGDEE is diethylene glycol diethylether While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention be defined by the scope of the appended claims as broadly as the prior art will permit, and in view of the specification.

What is claimed is:

1. A stripping composition comprising:
   (i) about 10% to about 60% by weight of an arylalkyl alcohol or N-methylpyrrolidone,
   (ii) about 30% to about 70% by weight of a low molecular weight aliphatic alcohol or lactone; and
   (iii) about 0% to about 50% by weight of water.

2. The stripping composition of claim 1 wherein said arylalkyl alcohol is benzyl alcohol or its alkyl or alkoxy substituted derivative.

3. The stripping composition of claim 2 wherein said arylalkyl alcohol is methylbenzyl alcohol, dimethylbenzyl alcohol or methoxy benzyl alcohol.

4. The stripping composition of claim 1 wherein said low molecular weight aliphatic alcohol is isopropyl alcohol, ethyl alcohol, butyl alcohol, methoxyethyl alcohol, ethoxyethyl alcohol or butoxyethyl alcohol.

5. The stripping composition of claim 1 wherein said low molecular weight lactone is γ-butyralactone or its derivative.

6. The stripping composition of claim 1 further comprising an additive.

7. The stripping composition of claim 6 wherein said additive is a surfactant.

8. The stripping composition of claim 7 wherein said surfactant is a non-ionic surfactant.

9. The stripping composition of claim 8 wherein said non-ionic surfactant has a HLB value of about 7 to about 15.

10. The stripping composition of claim 8 wherein said non-ionic surfactant is a block copolymer of ethylene oxide and propylene oxide, sorbitan ethoxylate or alkylphenyl ethoxylate.

11. The stripping composition of claim 10 wherein said alkylphenyl ethoxylate is nonylphenyl ethoxylate or octylphenyl ethoxylate.

12. An embossable composition comprising a non-crosslinkable, solvent soluble or dispersible non-ionic surfactant, polymer or protective colloid, colloidal or nano particles of silica or tricalcium phosphate.

13. The embossable composition of claim 12 wherein said non-crosslinkable, solvent soluble or dispersible polymer is acrylic or methacrylic copolymer, poly(alpha-methylstyrene) copolymer, polyvinylpyrrolidone copolymer, polyvinylacetate copolymer, polycaprolactone, polyester, polyurethane, polyvinylether copolymer, polyether or polyalkyleneoxide copolymer or block copolymer.

14. The embossable composition of claim 12 wherein said non-crosslinkable, solvent soluble or dispersible polymer is alkyl methacrylate copolymer, polyvinylpyrrolidone copolymer or poly(ethylene oxide-b-propylene oxide).

15. A process for manufacturing an electrophoretic display comprising a first electrode layer and a second electrode layer, a layer of display cells sandwiched between the two electrode layers; and optionally an adhesive layer between one of the two electrode layers and the display cell layer, which process comprises:
   a) removing the first electrode layer in a predetermined area;
   b) stripping off the adhesive layer if present, and the display cell layer in the predetermined area to expose the second electrode layer thereunder with a stripping solution comprising about 10% to about 60% by weight of an arylalkyl alcohol or N-methylpyrrolidone, about 30% to about 70% by weight of a low molecular weight aliphatic alcohol or lactone; and about 0% to about 50% by weight of water; and
   c) connecting conductor lines or patterns on the exposed second electrode layer to a driver circuitry.

16. The process of claim 15 wherein said electrophoretic display further comprising a sealing layer enclosing an electrophoretic fluid within each of said display cells and optionally a primer layer between the layer of display cells and the second electrode layer, which process comprises:
   a) removing the first electrode layer in a predetermined area;
   b) stripping off the adhesive layer if present, the display cell layer, the sealing layer and the primer layer if present, in the predetermined area to expose the second electrode layer thereunder with a stripping solution comprising about 10% to about 60% by weight of an arylalkyl alcohol or N-methylpyrrolidone, about 30% to about 70% by weight of a low molecular weight aliphatic alcohol or lactone; and about 0% to about 50% by weight of water; and
   c) connecting conductor lines or patterns on the exposed second electrode layer to a driver circuitry.

17. The process of claim 15 wherein said arylalkyl alcohol is benzyl alcohol or its alkyl or alkoxy substituted derivative.

18. The process of claim 17 wherein said arylalkyl alcohol is methylbenzyl alcohol, dimethylbenzyl alcohol or methoxy benzyl alcohol.

19. The process of claim 15 wherein said low molecular weight aliphatic alcohol is isopropyl alcohol, ethyl alcohol, butyl alcohol, methoxyethyl alcohol, ethoxyethyl alcohol or butoxyethyl alcohol.

20. The process of claim 15 wherein said low molecular weight lactone is γ-butyralactone or its derivative.

21. The process of claim 15 wherein said stripping solution further comprises an additive.

22. The process of claim 21 wherein said additive is nonylphenyl ethoxylate or octylphenyl ethoxylate.

23. The process of claim 15 further comprising edge sealing of areas not to be stripped.

24. The process of claim 15 further comprising placing a solvent pad in contact with the layers to be stripped.

25. The process of claim 24 wherein said solvent pad is formed of a membrane or sponge.

26. The process of claim 24 wherein said solvent pad is formed from a material selected from the group consisting of polyurethanes, cotton, cellulose derivatives, polyesters, nylon, acrylics and blends or composites thereof.

27. The process of claim 24 wherein said solvent pad is formed from a material having a critical surface tension higher than 30 dyne/cm.

28. The process of claim 24 wherein said solvent pad is UltraSORB Wiper (Wilshire), Spec Wipe 3 (VWR) or C-PD914DD (3M).

* * * * *